(12) United States Patent
Anantharaman

(10) Patent No.: US 8,281,487 B2
(45) Date of Patent: Oct. 9, 2012

(54) CONTROL OF CASE WALL GROWTH DURING REPAIR AND METHOD

(75) Inventor: Ganesh Anantharaman, East Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 665 days.

(21) Appl. No.: 12/356,341

(22) Filed: Jan. 20, 2009

(65) Prior Publication Data

US 2010/0181366 A1    Jul. 22, 2010

(51) Int. Cl.
*B23P 6/00* (2006.01)
(52) U.S. Cl. .................... 29/889.1; 29/402.19
(58) Field of Classification Search .............. 29/889.1, 29/402.08, 402.09, 402.19
See application file for complete search history.

(56) References Cited

U.S. PATENT DOCUMENTS

| | | |
|---|---|---|
| 3,741,824 A | 6/1973 | Duvall et al. |
| 4,028,787 A * | 6/1977 | Cretella et al. .............. 29/889.1 |
| 4,597,258 A | 7/1986 | Harris |
| 5,333,993 A | 8/1994 | Stueber et al. |
| 6,128,820 A | 10/2000 | Nolan et al. |
| 6,173,491 B1 * | 1/2001 | Goodwater et al. ......... 29/889.1 |
| 6,345,441 B1 * | 2/2002 | Farmer et al. ............... 29/889.1 |
| 6,494,683 B1 | 12/2002 | Nolan et al. |
| 6,892,931 B2 | 5/2005 | Steplewski et al. |
| 7,244,320 B2 | 7/2007 | Malley et al. |
| 7,296,415 B2 | 11/2007 | Coulon et al. |
| 7,759,614 B2 * | 7/2010 | Clark et al. .................. 219/400 |
| 2006/0242830 A1 | 11/2006 | Green et al. |
| 2007/0283560 A1 | 12/2007 | Malley |
| 2007/0289954 A1 | 12/2007 | Bien et al. |
| 2009/0269208 A1 * | 10/2009 | Szela et al. ................ 416/241 R |

* cited by examiner

*Primary Examiner* — Alexander P Taousakis
(74) *Attorney, Agent, or Firm* — Kinney & Lange, P.A.

(57) ABSTRACT

A method for repairing a gas turbine engine component includes identifying a distorted feature located in a first portion of the component, identifying a second portion of the component that behaves as at least one of a heat sink or a stiffener, removing the second portion of the component from the first portion, cold working the first portion of the component to repair the distorted feature, heat treating the first portion of the component, and metallurgically joining the first portion of the component to the second portion of the component.

15 Claims, 4 Drawing Sheets

CONTROL OF CASE WALL GROWTH DURING REPAIR AND METHOD

BACKGROUND

This disclosure relates to engine component repairs involving heat treatment.

Engine components, such as case structures for gas turbine engines, can become worn or damaged during use. For example, distorted features, like bulges, can develop in case walls and necessitate gas turbine engine case replacement or repair. Generally, replacement of worn and damaged parts can be expensive, while repairs to existing parts can be more cost-effective. However, known methods for repairing distorted features in annular cases involve heat treatment, which tends to induce new distortions in the part leading to a need for substantial rework. This has made case repairs impractical or uneconomical. It is desired to provide a cost effective and efficient repair method to enable repairs to engine cases with distorted features.

SUMMARY

A method for repairing a gas turbine engine component includes identifying a distorted feature located in a first portion of the component, identifying a second portion of the component that behaves as at least one of a heat sink or a stiffener, removing the second portion of the component from the first portion, cold working the first portion of the component to repair the distorted feature, heat treating the first portion of the component, and metallurgically joining the first portion of the component to the second portion of the component.

DETAILED DESCRIPTION

Figure 1:
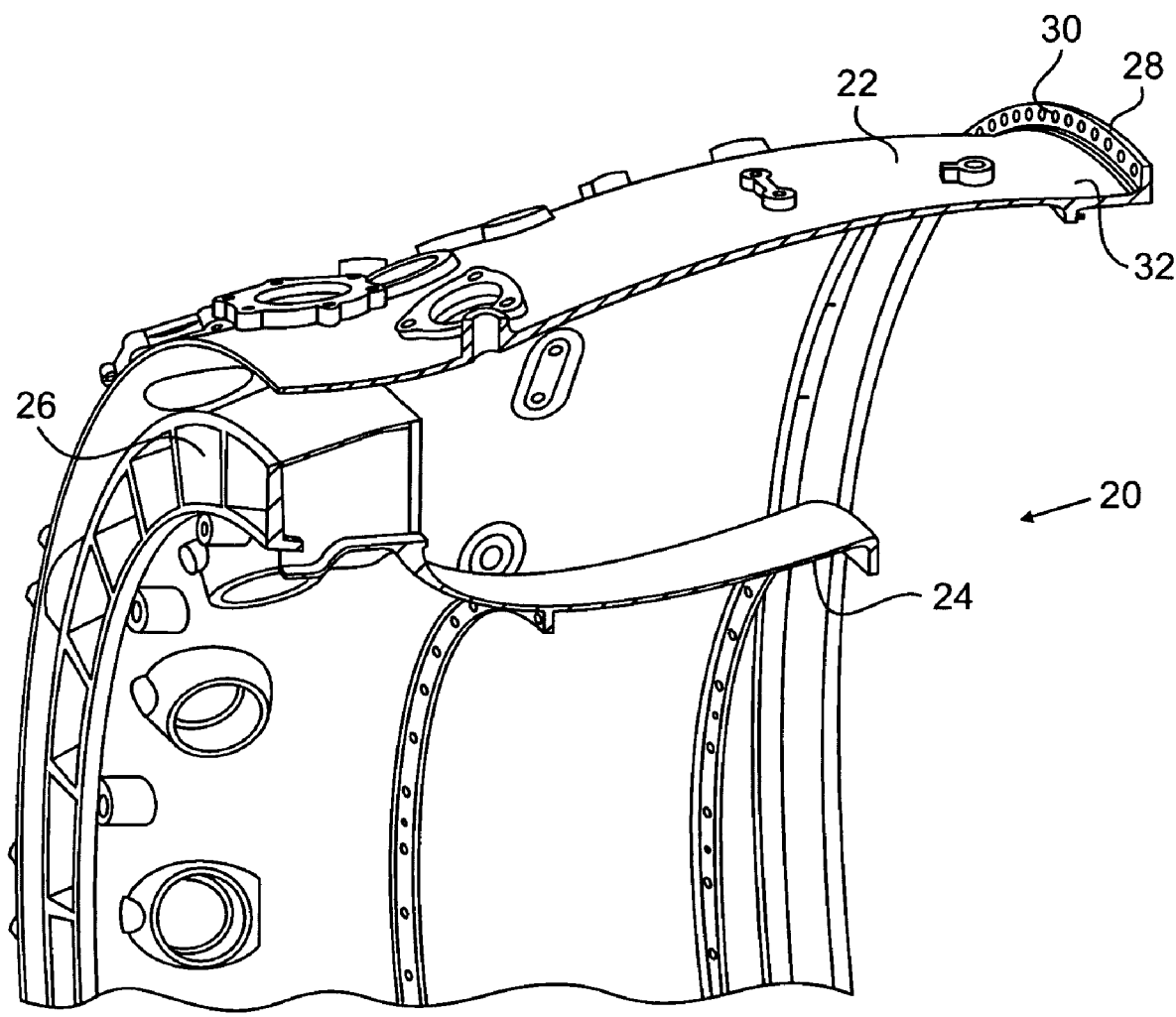
FIG. 1 is a cross-sectional perspective view of a diffuser case for a gas turbine engine.

FIG. 1 is a cross-sectional perspective view of a diffuser case 20 for a gas turbine engine. As is well-known in the art, the diffuser case 20 is typically located aft of a compressor section of the engine and has a cross-sectional flow area in the direction that increases in a downstream direction in order to decrease velocity and increase static pressure of fluid passing therethrough, which helps prepare the fluid for mixing with fuel for combustion. The general configuration and operation of gas turbine engines is well known in the art, and therefore is not discussed in detail here.

As shown in FIG. 1, the diffuser case 20 includes an outer wall 22, an inner wall 24, a plurality of vanes 26 located at a forward end of the case 20, and an aft flange 28 extending from the outer wall 22. A plurality of circumferentially spaced bolt holes 30 are formed in the aft flange 28, which enable the diffuser case 20 to be mechanically connected to other components of an engine. Undesirable distorted features, such as a bulge 32, can develop in the outer wall 22 (or other locations) during use and necessitate replacement or repair of the diffuser case 20.

Figure 2:
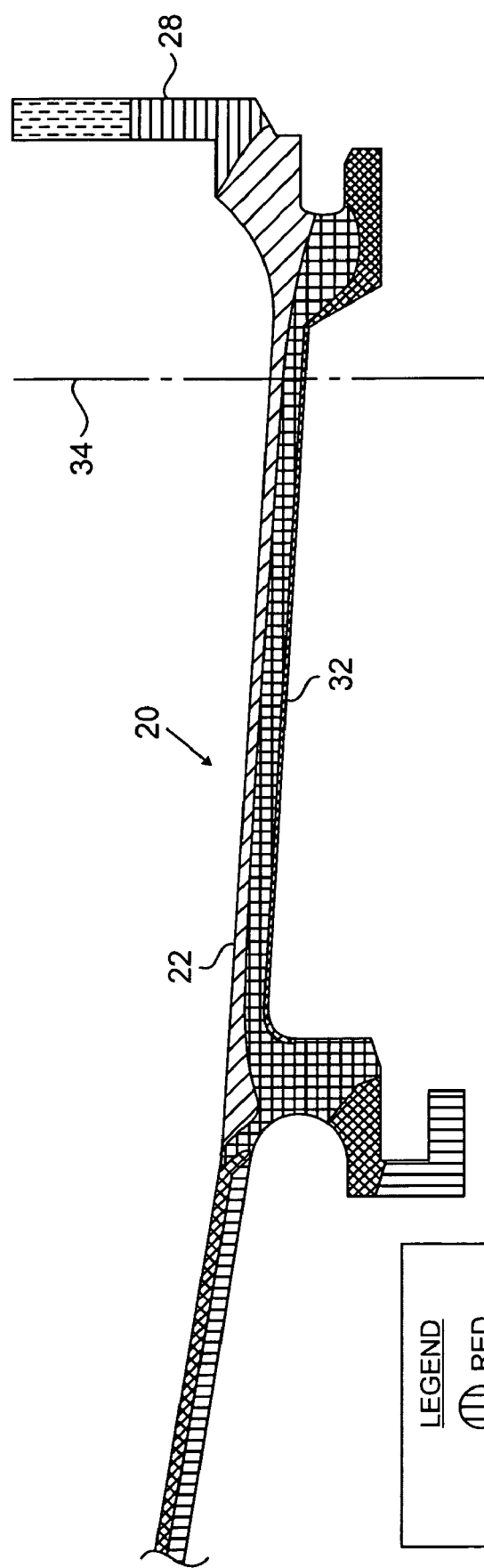
FIG. 2 is cross-sectional view of an outer diameter wall portion of the diffuser case, shaded to show temperature gradients.

FIG. 2 is cross-sectional view of a portion of the outer wall 22 of the diffuser case 20. The portion of the diffuser case 20 shown in FIG. 2 is shaded to show temperature gradients in red, orange, yellow, green, cyan, and blue, where red represents the highest temperature, blue represents the lower temperature and the remaining colors designate intermediate temperatures (with magnitudes that vary between those of red and blue in the order listed). The shaded temperature gradients represent heat affected zones in the diffuser case 20 in response to applied heat, such as heat produced during a heat treatment process. Red areas tend to experience greater thermal expansion (or growth), while blue areas tend to experience lesser or the least thermal expansion. Portions of the diffuser case 20 that experience the least thermal expansion in response to applied heat tend to act like heat sinks. Heat sinks tend to deflect less than other portions of the diffuser case 20 when heat is applied, which can induce distortion in the diffuser case 20 during a repair heat treatment. Structures that are configured as relatively large concentrations of materials or configured with certain geometric properties, can also behave as stiffeners, which may restrict growth and movement of other heat affected zones during heat treatment. In the illustrated embodiment, the aft flange 28 tends to act as both a heat sink and a stiffener in the diffuser case 20.

During repair, in order to minimize the diffuser case 20 distortion caused by portions that act like a heat sink and/or stiffener (e.g., the aft flange 28), one or more such portions can be removed prior to undertaking particular repair process steps. A cut plane 34 can be determined at a relatively low-stress location, and the aft flange 28 can be removed from the rest of the diffuser case 20 at the cut plane 34. Known machining processes can be used to remove the aft flange 28. Once the aft flange 28 or other heat sinks and/or stiffeners have been removed, cold work or other processes can be performed on the remaining portion of the diffuser case 20 to address the bulge 32 or other distorted feature and followed by heat treatment. The removal of the aft flange 28 which can act as a heat sink and stiffener will help reduce distortion during heat treatment and help reduce the need for rework. Following heat treatment, the salvaged flange 28 or a new replacement detail configured like the flange 28 can be reattached to the diffuser case 20 with a suitable welding process (e.g., electron beam welding). In embodiments where a new replacement detail is used, the replacement material can be the same or different from the parent material of the diffuser case 20. Use of a replacement detail of different material is disclosed in commonly-assigned U.S. patent application Ser. No. 12/356,321 (published as U.S. Pat. App. Pub. No. 2010/0180417), entitled "Replacement Of Part Of Engine Case With Dissimilar Material" and filed on even date herewith, which is hereby incorporated by reference in its entirety. Limited heat treatment, with suitable fixturing, can be performed on the weld joint after the flange 28 (or new replacement detail) is reattached.

Figure 3:
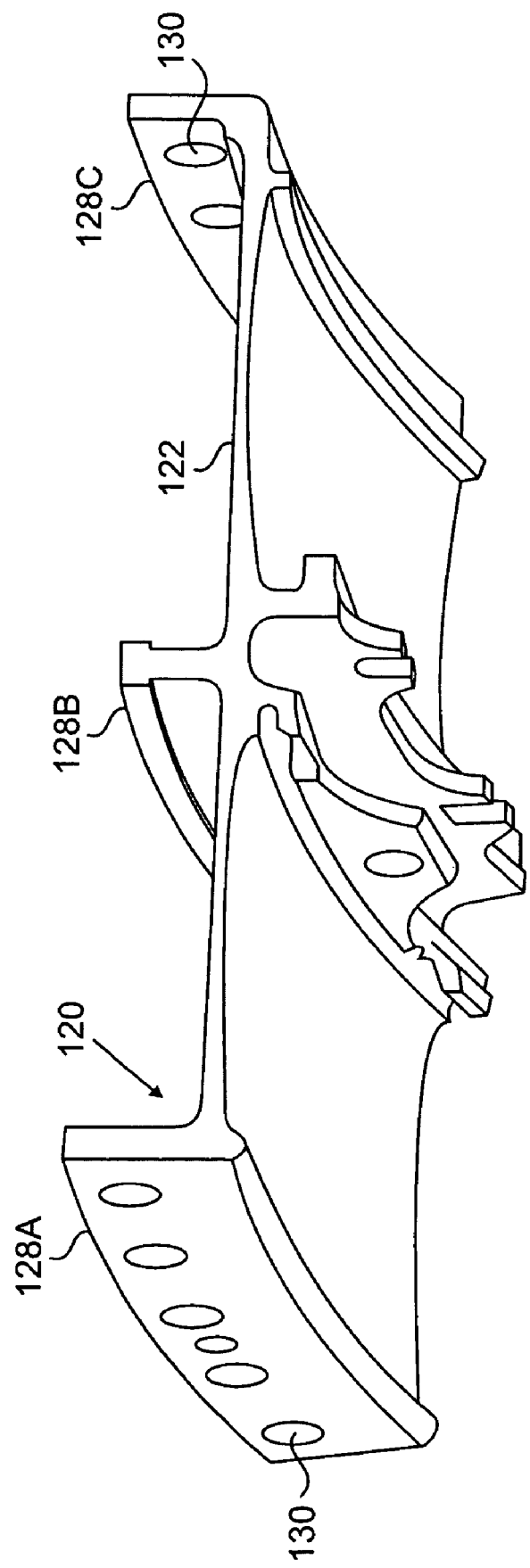
FIG. 3 is a perspective view of an outer case segment for a gas turbine engine.

The repair process of this disclosure can be performed on other engine components. FIG. 3 is a perspective view of an outer case segment 120 for case assembly of a gas turbine engine. The case segment 120 is configured to be connected to a plurality of additional case segments in order to form an annular case assembly, in a manner well known in the art. The case segment 120 includes an outer case wall 122, and forward, middle and aft flanges 128A, 128B and 128C, respectively. Bolt holes 130 are formed in both the forward and aft flanges 128A and 128C. The forward, middle and aft flanges 128A, 128B and 128C, which each act as both stiffeners and heat sinks, can all be removed from the outer case wall 122 prior to performing cold work and heat treatment on the case segment 120. Following heat treatment, the salvaged flanges 128A-128C or one or more new replacement details configured like the flanges 128A-128C can be reattached to the case segment 120 with a suitable welding process. Limited heat treatment, with suitable fixturing, can be performed on the weld joint after the flanges 128-128C (or new replacement details) are reattached.

Figure 4:
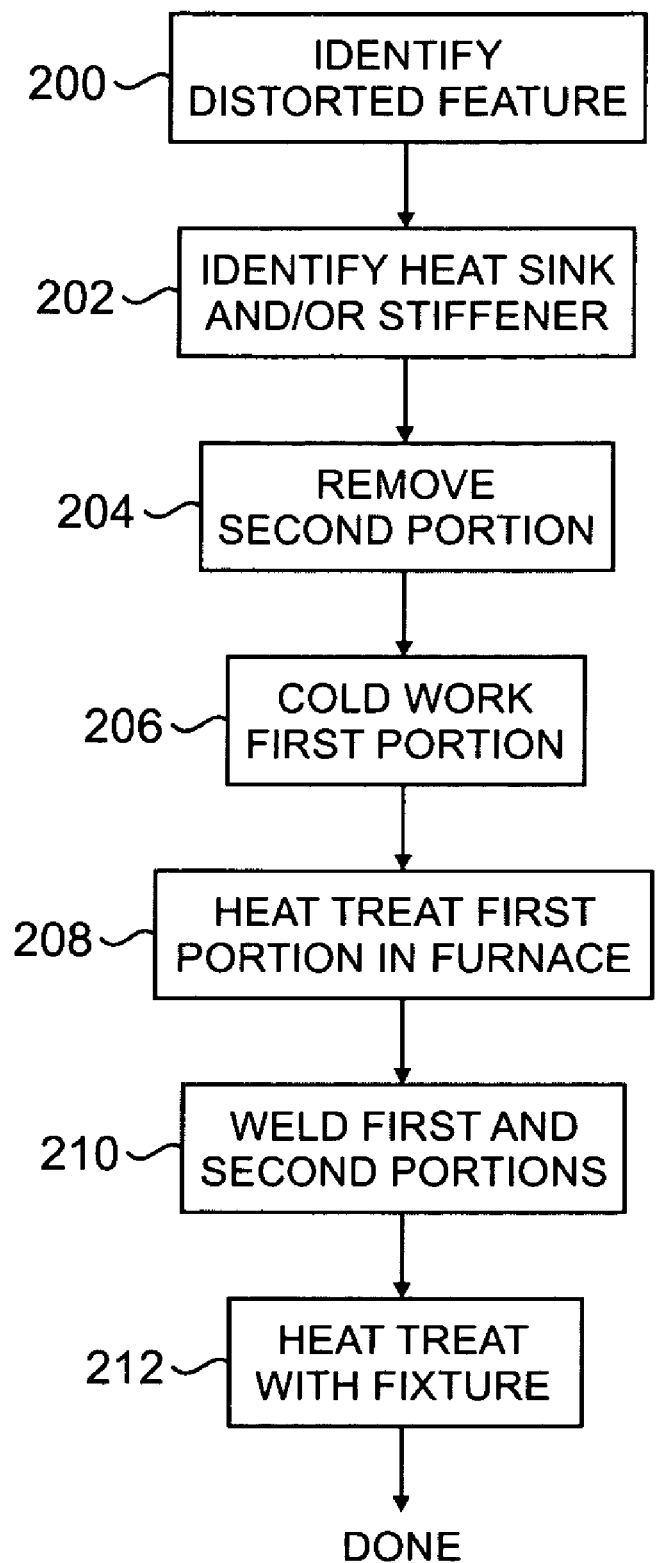
FIG. 4 is a flow chart of a repair method.

FIG. 4 is a flow chart of one embodiment of a repair method. After a part (e.g., a gas turbine engine case component) has been removed from an engine, a first step is to identify a distorted feature or other aspect in need of repair (step 200). The distorted feature or other aspect in need of repair can be located in a first portion of the component. Next, at least one heat sink and/or stiffener is identified (step 202). Identification of the heat sink and/or stiffener can be performed by visual inspection to locate area of concentration of material. Alternatively, other methods can be used, such as the use of thermal sensing equipment to identify thermal gradients produced as a function of applied heat. In one embodiment, the heat sink and/or stiffener includes a flange.

After the heat sink and/or stiffener has been identified, a second portion of the component that includes the heat sink and/or stiffener is removed from the first portion (step 204). Removal can be accomplished using known machining techniques. Next, cold work is performed on the first portion of the component to repair the distorted feature or other aspect in need of repair (step 206). Cold work can include any known cold working techniques, which are generally selected to correspond to the particular distorted feature or other aspect in need of repair that is present on a given component, as will be understood by those of ordinary skill in the art. The first portion of the component, with the second portion removed, can then be placed in a furnace to provide heat treatment (step 208). Following heat treatment, the first portion is metallurgically joined to the second portion (which can be the salvaged material previously removed or a new replacement detail of substantially the same shape as the removed material) (step 210). Electron beam or other welding techniques can be used to weld the first and second portions at this step. Lastly, focused or limited heat treatment can be performed on a region of the weld between the first and second portions, with suitable fixturing to reduce a risk of distortion to the component (step 212). The repaired part can then be reinstalled in the engine and returned to service.

By removing flanges or other structures that act like stiffeners and/or heat sinks prior to heat treatment, component walls can grow and otherwise behave differently than they otherwise would during heat treatment. This can help reduce the creation of distortions in the component during heat treatment, thereby reducing the need for rework in conjunction with a repair. Overall this can help reduce repair turnaround time (TAT) and costs, and provide a relatively efficient and effective repair for returning worn or damaged engine components to service.

Although exemplary embodiments have been described, workers skilled in the art will recognize that changes may be made in form and detail without departing from the spirit and scope of the invention. For instance, the repair method can be applied to engine components have different configurations than the exemplary embodiments disclosed herein, and can be performed in conjunction with other repair processes not specifically mentioned.

The invention claimed is:

1. A method for repairing a gas turbine engine component, the method comprising:

identifying a distorted feature of the component, wherein the distorted feature is located in a first portion of the component;

identifying a second portion of the component that behaves as at least one of a heat sink or a stiffener;

removing the second portion of the component from the first portion;

cold working the first portion of the component to repair the distorted feature without adding material to the distorted feature during cold working;

heat treating the first portion of the component while the second portion of the component is removed from the first portion; and metallurgically joining the first portion of the component to the second portion of the component.

2. The method of claim 1 and further comprising:

heat treating a joint between the first and second portions of the component subsequent to metallurgical joining.

3. The method of claim 1, wherein the step of metallurgically joining the first and second portions of the component comprises welding.

4. The method of claim 1, wherein the step of identifying a second portion of the component that behaves as at least one of a heat sink or a stiffener comprises visual inspection.

5. The method of claim 1, wherein the step of identifying a second portion of the component that behaves as at least one of a heat sink or a stiffener comprises identifying a flange.

6. The method of claim 1, wherein the first portion of the component is substantially arcuate in shape, and wherein the step of identifying a distorted feature of the component comprises identifying a bulge in the first portion.

7. The method of claim 1, wherein the step of heat treating the first portion of the component comprises placing the first portion of the component in a furnace.

8. A method for repairing a metallic gas turbine engine component having a first portion, the method comprising:

identifying a distorted feature of the component identifying by visual inspection a second portion of the component that behaves as at least one of a heat sink or a stiffener;

removing the second portion of the component from the first portion;

cold working the first portion of the component to repair the distorted feature without adding material to the distorted feature during cold working;

heat treating the first portion of the component in a furnace; and welding the first portion of the component to the second portion of the component subsequent to heat treating the first portion of the component in a furnace.

9. The method of claim 8 and further comprising:

heat treating a joint between the first and second portions of the component subsequent to welding.

10. The method of claim 8, wherein the step of identifying by visual inspection a second portion of the component that behaves as at least one of a heat sink or a stiffener comprises identifying a flange.

11. The method of claim 1, wherein the first portion of the component is substantially arcuate in shape, and wherein the step of identifying a distorted feature of the component comprises identifying a bulge in the first portion.

12. The method of claim 8, wherein the step of heat treating the first portion of the component comprises placing the first portion of the component in a furnace.

13. A method for repairing a metallic gas turbine engine component having a first portion, the method comprising:

identifying a distorted feature of the component determining temperature gradients of heat affected zones in response to an applied heat;
identifying at least one of the heat affected zones as a second portion of the component that behaves as at least one of a heat sink or a stiffener;
removing the second portion of the component from the first portion;
cold working the first portion of the component to repair the distorted feature without adding material to the distorted feature during cold working;
heat treating only the first portion of the component in a furnace; and
welding the first portion of the component to the second portion of the component.

14. The method of claim 13 and further comprising:
heat treating a joint between the first and second portions of the component subsequent to welding.

15. The method of claim 13, wherein the step of identifying at least one of the heat affected zones as a second portion of the component that behaves as at least one of a heat sink or a stiffener comprises identifying a flange.

* * * * *